United States Patent
Ukita

(10) Patent No.: US 6,650,363 B1
(45) Date of Patent: Nov. 18, 2003

(54) COLOR SUPPRESSION CIRCUIT AND ELECTRONIC CAMERA USING IT

(75) Inventor: Shinji Ukita, Kawanishi (JP)

(73) Assignee: Sanyo Electric Co., Ltd. (JP)

( * ) Notice: Subject to any disclaimer, the term of this patent is extended or adjusted under 35 U.S.C. 154(b) by 0 days.

(21) Appl. No.: 09/263,596

(22) Filed: Mar. 5, 1999

(30) Foreign Application Priority Data

Mar. 10, 1998 (JP) ............................................. 10-058163

(51) Int. Cl.[7] ................................................. H04N 9/73
(52) U.S. Cl. ............................... 348/223.1; 348/222.1; 358/512; 358/520
(58) Field of Search ........................... 348/222.1, 223.1; 358/512, 518, 520

(56) References Cited

U.S. PATENT DOCUMENTS 5,461,429 A * 10/1995 Konishi et al. ............. 348/656

FOREIGN PATENT DOCUMENTS

| JP | 62035792 | 2/1987 |
|----|----------|--------|
| JP | 02104186 | 4/1990 |
| JP | 04168895 | 6/1992 |

* cited by examiner

*Primary Examiner*—Kimberly A. Williams
*Assistant Examiner*—Dorothy Wu
(74) *Attorney, Agent, or Firm*—Michaelson & Wallace; Peter L. Michaelson

(57) ABSTRACT

Based on an output from a CCD, a luminance signal Y1 is extracted from an MTX circuit, and R gain and B gain of white balance information are extracted from a white balance control circuit. A luminance color gain conversion circuit generates a control signal for controlling the color gains of a high-luminance part based on the luminance signal Y1, R gain and B gain and supplies the generated control to a color suppression circuit. The color gains are varied as a color temperature of the high luminance part increasingly deviates from a color temperature associated with ordinary white light. Accordingly, an excellent color suppression characteristic for the high-luminance part is obtained relative to change in color temperature.

7 Claims, 4 Drawing Sheets

| Ye | Cy | Ye | Cy |
|----|----|----|----|
| Mg | Gr | Mg | Gr |
| Ye | Cy | Ye | Cy |
| Gr | Mg | Gr | Mg |

| Ye | Cy | Ye | Cy |
|----|----|----|----|
| Gr | Mg | Gr | Mg |
| Ye | Cy | Ye | Cy |
| Gr | Mg | Gr | Mg |

FIG. 5          PRIOR ART
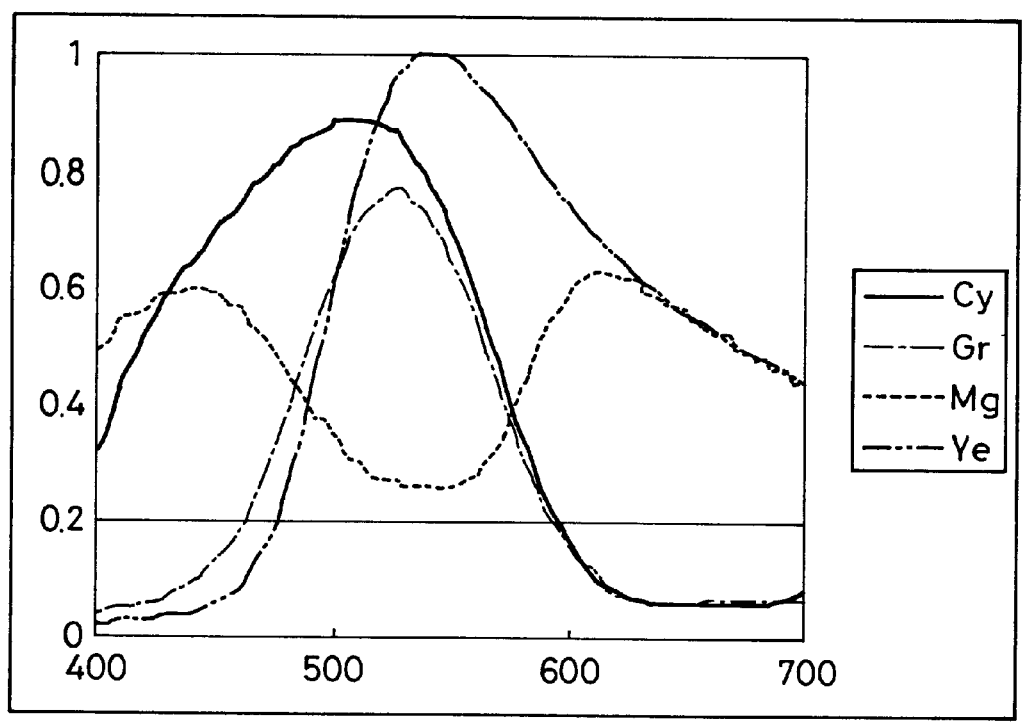

COLOR SUPPRESSION CIRCUIT AND ELECTRONIC CAMERA USING IT

BACKGROUND OF THE INVENTION

1. Field of the Invention

The present invention relates to a color suppression circuit and an electronic camera using it. More particularly, the invention relates to a color suppression circuit capable of suppressing a high-luminance part of a signal supplied from a CCD imager having color filters for complementary colors and used in a still camera.

2. Description of the Background Art

Referring to FIG. 3A or 3B, in a CCD having color filters for complementary colors, the color filters for four complementary colors (yellow (Ye), cyan (Cy), green (Gr), magenta (Mg)) are arranged.

FIG. 4 is a block diagram of a still camera using a CCD where the complementary color filters illustrated in FIGS. 3A and 3B are arranged. Referring to FIG. 4, an output signal of a CCD 1 is supplied to a correlation double sampling circuit (hereinafter referred to as CDS circuit) 2 to reduce noise, and thereafter converted to a 10-bit digital signal by an A/D converter 3. In the case of a single-plate camera, the signal from A/D converter 3 is supplied to a pixel interpolation circuit 4, and four complementary color signals Ye, Cy, Mg and Gr are generated at all pixel positions. The signals are thereafter supplied to a matrix (hereinafter referred to as MTX) circuit 5, and luminance signal Y1 and color difference signals CR and CB represented by the following equations (1a), (1b) and (1c) are produced.

$$Y1 = Ye + Mg + Cy + Gr (= 2r + 3g + 2b) \quad (1a)$$

$$CR = (Ye + Mg) - (Cy + Gr) (= 2r - g) \quad (1b)$$

$$CB = (Mg + Cy) - (Gr + Ye) (= 2b - g) \quad (1c)$$

The three signals are then supplied to an MTX circuit 6 and converted to r, g and b by the following equations (2a), (2b) and (2c).

$$r = 0.1(Y1 + 4CR - CB) \quad (2a)$$

$$g = 0.1(2Y1 - 2CR - 2CB) \quad (2b)$$

$$b = 0.1(Y1 - 4CR + CB) \quad (2c)$$

The converted r, g and b signals are supplied to a white balance circuit 7. R gain and B gain are supplied to white balance circuit 7 from a white balance control circuit 11, and white balance circuit 7 multiplies the R gain and the r signal, and multiplies the B gain and the b signal to carry out white balance correction, and outputs RGB signals represented by equations (3a), (3b) and (3c) below.

$$R = R \text{ gain} \times r \quad (3a)$$

$$G = g \quad (3b)$$

$$B = B \text{ gain} \times b \quad (3c)$$

Overflow-clipping is applied to the RGB signals to produce full scale 10 bits by white balance circuit 7, and the resultant RGB signals are supplied to a gamma correction circuit 8 where gradation correction is made by 0.45th power to generate 8-bit data.

$$R' = 255 \times (R/1023)^{0.45} \quad (4a)$$

$$G' = 255 \times (G/1023)^{0.45} \quad (4b)$$

$$B' = 255 \times (B/1023)^{0.45} \quad (4c)$$

White balance control circuit 11 calculates the average in the picture plane, sumR, sumG and sumB for each data of R, G and B and feeds back the R gain and G gain to a multiplier circuit of white balance circuit 7 such that sumR=sumG and sumB=sumG are satisfied. The primary color signals R', G' and B' to which gamma correction has been applied by gamma correction circuit 8 are supplied to a matrix circuit 9 and converted to a luminance signal Y and color difference signals U and V according to the following equations (5a), (5b) and (5c).

$$Y = 0.299R' + 0.587G' + 0.114B \quad (5a)$$

$$U = -0.1684(R' - G') + 0.5(B' - G') \quad (5b)$$

$$V = 0.5(R' - G') - 0.0813(B' - G') \quad (5c)$$

For a high-luminance subject, all four complementary colors of the output from CCD 1 are saturated. If 10-bit A/D converter 3 is used, Ye=Cy=Mg=Gr=1023 is established. Each signal amount is then determined as below using equations (1) to (5).

$$CR = CB = 0 \quad (6)$$

$$Y1 = 4092, \ r = b = 409, \ g = 818 \quad (7)$$

Suppose that the white balance correction values given by white balance control circuit 11 are obtained as below.

$$R \text{ gain} = 2, \ B \text{ gain} = 2 \quad (8)$$

Then the following result is obtained.

$$R = G = B = 818$$

$$R' = G' = B' = 231$$

$$Y = 231$$

$$U = V = 0$$

Accordingly, the corresponding portion is achromatic color.

In most cases, the spectral characteristics of the complementary color filters are determined as shown in FIG. 5 such that CR=CB=0 is satisfied as shown in the equation (6) when a white subject is imaged with illumination by ordinary white light (color temperature 5500K). Following the equation (2), the expressions below are satisfied.

$$r = 0.1Y1, \ g = 0.2Y1, \ b = 0.1Y1 \quad (9)$$

Consequently, the multipliers for the white balance correction are obtained as those values of the equation (8).

Considering above, when a white subject is imaged with illumination at color temperature 5500K, a non-saturated portion and a saturated portion are both reproduced as achromatic color if R gain=2 and B gain=2 are applied.

In the case of illumination by an incandescence lamp (color temperature 2750K) for a white non-saturated subject, white balance correction values are obtained as R gain=1 and B gain=4 since r=g=818 and b=205 are applied. However, for the portion where all four complementary colors are saturated, equations (6) and (7) are satisfied as in the case of color temperature 5500K. Therefore, following expressions are established after the white balance correction.

$$R = 1 \times 409 = 409, \ G = 818, \ B = 4 \times 409 = 1023 \text{(due to overflow clipping)}$$

Accordingly, when the white balance correction is precisely applied to the non-saturated portion of the incandescence lamp, the saturated portion is colored to bluish green. On the contrary, if white balance correction values are obtained as R gain=4 and B gain=1 as in the case of the shade in fine whether (color temperature 11000K), white balance output in the saturated portion is R=1023, G=818, and B=409, and the portion is colored to yellowish red.

In order to solve this problem, a color suppression circuit 10 and a luminance.color gain conversion circuit 12 are conventionally provided for color suppression of a high-luminance part as shown in FIG. 4. Luminance.color gain conversion circuit 12 sets a multiplier of UV (or modulation color signal) or the gain of an amplifier to color suppression circuit 10 based on luminance signal Y1. However, this operation is not enough to appropriately carry out suppression in a wide range of color temperature. Specifically, if a sufficient suppression effect is to be ensured for color temperatures 2750K and 11000K, suppression is excessively done for 5500K to deteriorate the dynamic range.

SUMMARY OF THE INVENTION

One object of the present invention is to provide a color suppression circuit to obtain an excellent color suppression characteristic for a high-luminance part relative to variation in color temperature and provide an electronic camera employing the color-suppression circuit.

Briefly, the present invention is implemented as a color suppression circuit capable of suppressing a high-luminance part of a signal supplied from an imager where color filters are arranged for respective pixels. The signal supplied from the imager is processed to extract a luminance signal and information on white balance from a signal extraction circuit. Based on the extracted luminance signal and white balance information, the color gains of the high-luminance part of the signal from the imager is controlled. According to the invention, a superior color suppression characteristic for the high-luminance part can thus be obtained relative to change in color temperature, by controlling the color gains of the high-luminance part.

According to a preferred embodiment of the invention, a signal extraction circuit includes an A/D conversion circuit converting the signal from the imager to a digital signal, a matrix circuit generating a luminance signal and color signals of RGB from the converted digital signal, a white balance circuit applying white balance adjustment to the signals of RGB from the matrix circuit, and a white balance control circuit extracting information on white balance from color information of RGB of a white balance circuit output.

According to a more preferred embodiment of the invention, a suppression circuit is formed of a gain conversion circuit outputting a gain conversion signal for decreasing the color gains of the high-luminance part based on the luminance signal from the matrix circuit and the white balance information from the white balance control circuit, and a color suppression circuit applying color suppression to a high-luminance part of a color signal supplied from the white balance circuit, based on the supplied gain conversion signal.

According to a preferred embodiment of the invention, the signal suppression circuit is contained in an electronic camera.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 5 illustrates spectral characteristics of the complementary color filters.

DESCRIPTION OF THE PREFERRED EMBODIMENTS

Figure 1:
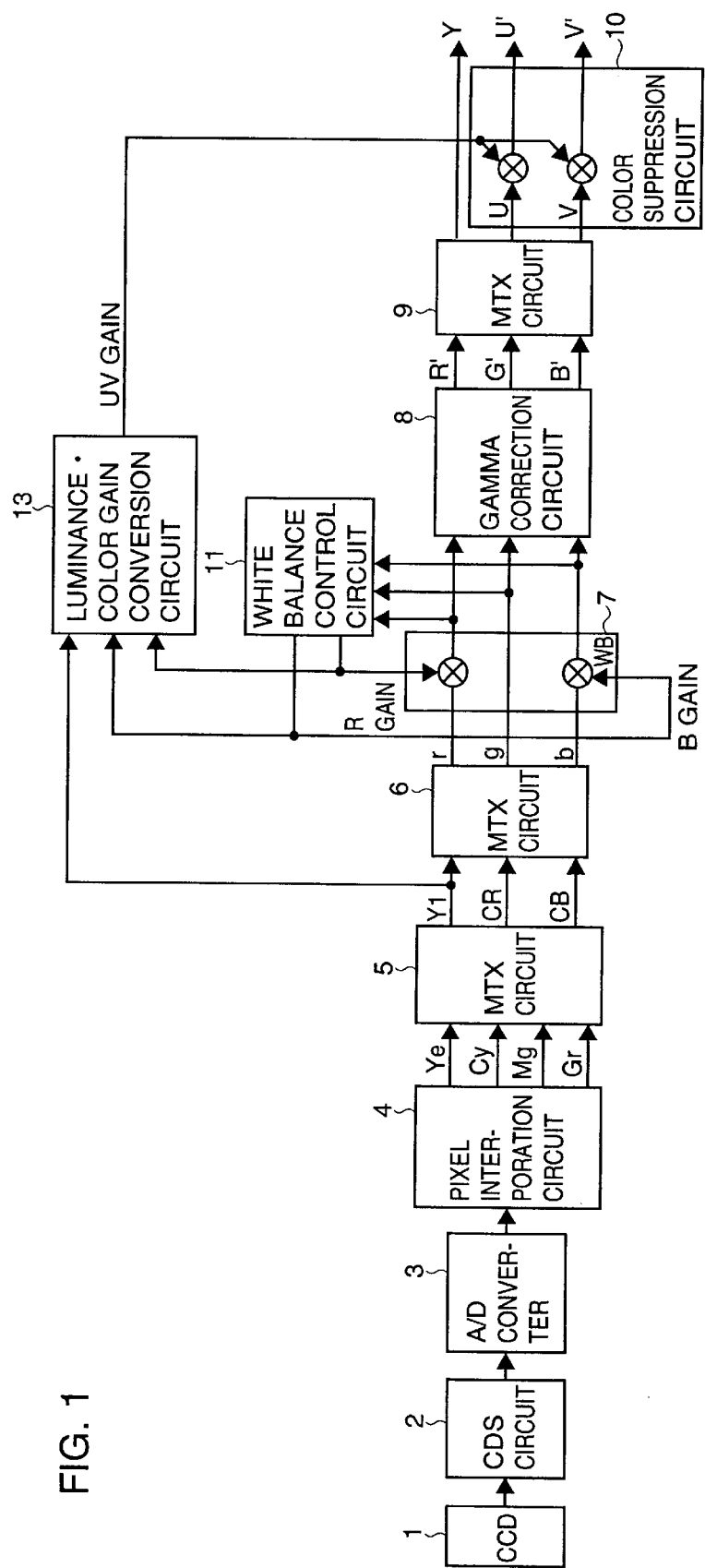
FIG. 1 is a block diagram according to one embodiment of the invention.

FIG. 1 is a block diagram according to one embodiment of the present invention. Referring to FIG. 1, a color suppression circuit 10 is configured in this embodiment such that the suppression characteristic follows a white balance correction value, noting the fact that suppression at color temperature 5500K is unnecessary and the need for suppression increases as the color temperature is away from 5500K.

Specifically, a luminance.color gain conversion circuit 13 receives a luminance signal Y1 from an MTX circuit 5 and receives white balance information R gain and B gain from a white balance control circuit 11. Luminance.color gain conversion circuit 13 controls the color gain of color suppression circuit 10 based on luminance signal Y1 and white balance information R gain and B gain to enable color suppression circuit 10 to obtain a superior color suppression characteristic for a high-luminance part relative to change in color temperature.

Luminance.color gain conversion circuit 13 is implemented as a kind of table or arithmetic expression that receives luminance signal Y1 and white balance information R gain and B gain as input and supplies UV gain as output, practically determined by an output of a CCD 1.

Figures 2, 3A, 3B:
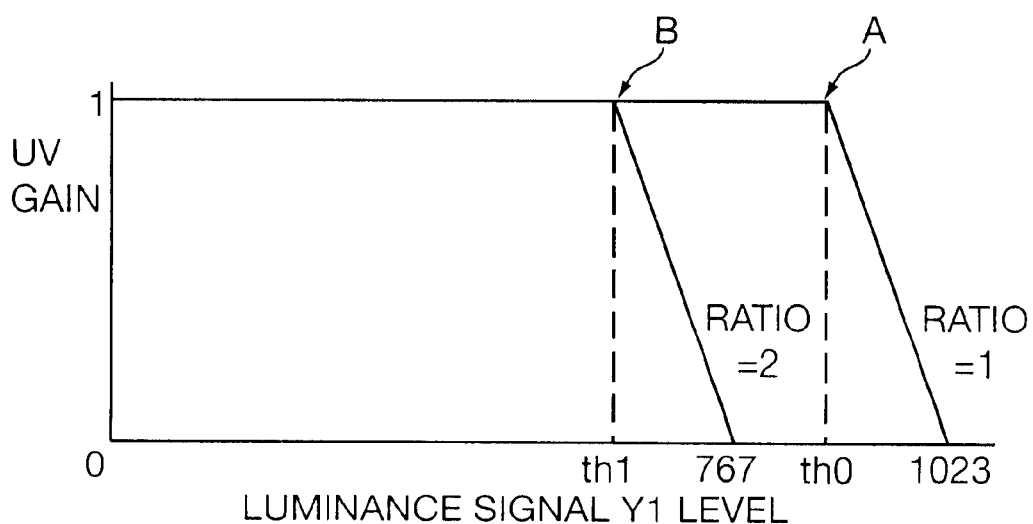
FIG. 2 illustrates a conversion characteristic of a luminance.color gain conversion circuit 13 shown in FIG. 1.
FIGS. 3A and 3B illustrate an arrangement of complementary color filters.
Figure 4:
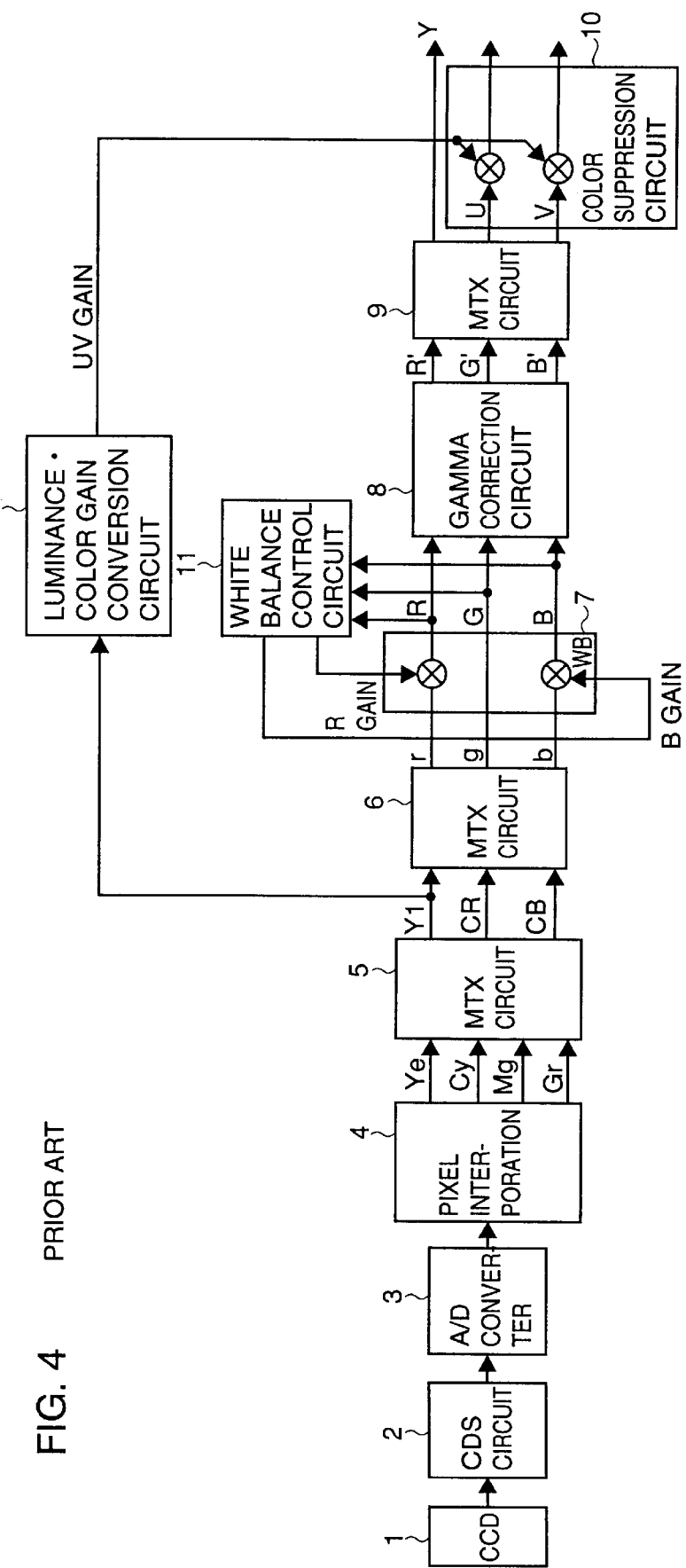
FIG. 4 is a block diagram illustrating a still camera using a CCD where the complementary color filters shown in FIGS. 3A and 3B are arranged.

FIG. 2 illustrates one example of a conversion characteristic of luminance.color gain conversion circuit 13. Referring to FIG. 2, when R gain=B gain=2 is satisfied or color temperature is 5500K, UV gain=1 is satisfied for an almost entire range of luminance. When the difference between any color temperature and 5500K increases, the degree of difference in gain is calculated using a parameter "ratio."

$$\text{ratio} = \text{MAX}(R\text{ gain}/2, B\text{ gain}/2)$$

(MAX(a,b) is a function selecting a larger one of a and b.) When "ratio"=1 is obtained, Y=1023 is satisfied at the zero-crossing point. When "ratio"=2 is obtained, Y=767 is satisfied at the zero-crossing point. The portion between 1 and 2 is linearly interpolated.

Although the embodiment described above employs color filters for four complementary colors Ye, Cy, Gr and Mg as examples, the color filters are not limited thereto. The invention is of course applicable to other known complementary color filters or primary color filters for R, G and B. In addition, although a CCD is employed as an imager as an example, the imager is not limited thereto, and the invention is thus applicable to other imagers such as CMOS.

As heretofore described, according to this embodiment of the invention, a superior color suppression characteristic for a high-luminance part is obtained relative to change in color temperature, by processing a signal from a CCD imager to extract a luminance signal and white balance information, and controlling the color gains of the high-luminance part based on the extracted signal.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A color suppression circuit capable of suppressing a high-luminance part of a signal supplied from an imager where color filters are arranged for respective pixels, comprising:

signal extraction means for processing the signal supplied from said imager to extract a luminance signal and white balance information; and suppression means for controlling color gains of the high-luminance part of the signal supplied from said imager based on the luminance signal and the white balance information extracted by said signal extraction means such that the color gains are varied as color temperature of the high-luminance part increasingly deviates from a color temperature associated with ordinary white light so as to obtain an improved color suppression characteristic for the high-luminance part.

2. The color suppression circuit according to claim 1, wherein said signal extraction means includes:

an A/D conversion circuit converting the signal from said imager to a digital signal;

a matrix circuit generating the luminance signal and color signals of RGB from the digital signal converted by said A/D conversion circuit;

a white balance circuit adjusting white balance for the color signals of RGB supplied from said matrix circuit based on said white balance information; and a white balance control circuit extracting said white balance information from color information of RGB of an output from said white balance circuit.

3. The color suppression circuit according to claim 2, wherein said suppression means includes:

a gain conversion circuit supplying a gain conversion signal for reducing the color gains of said high-luminance part based on the luminance signal supplied from said matrix circuit and the white balance information supplied from said white balance control circuit; and a color suppression circuit applying color suppression to the high-luminance part of the color signals supplied from said white balance circuit based on the gain conversion signal supplied from said gain conversion circuit.

4. The color suppression circuit according to claim 1, wherein said color suppression circuit is contained in an electronic camera.

5. The color suppression circuit according to claim 2, wherein said color suppression circuit is contained in an electronic camera.

6. A color suppression circuit capable of suppressing a high-luminance part of a signal supplied from an imager where color filters are arranged for respective pixels, comprising:

a signal extraction circuit processing the signal supplied from said imager to extract a luminance signal and white balance information; and a suppression circuit provided in a stage subsequent to said signal extraction circuit for controlling color gains of the high-luminance part of the signal supplied from said imager based on the luminance signal and the white balance information extracted by said signal extraction circuit such that the color gains are varied as color temperature of the high-luminance part increasingly deviates from a color temperature associated with ordinary white light so as to obtain an improved color suppression characteristic for the high-luminance part.

7. The color suppression circuit according to claim 6, wherein said color suppression circuit is contained in an electronic camera.

* * * * *